US011331852B2

(12) United States Patent
Von Burg et al.

(10) Patent No.: US 11,331,852 B2
(45) Date of Patent: May 17, 2022

(54) PROTECTION ELEMENT (71) Applicant: SINTRATEC AG, Brugg (CH)

(72) Inventors: Christian Von Burg, Niederteufen (CH); Dominik Solenicki, Brugg (CH); Joscha Zeltner, Olten (CH)

(73) Assignee: SINTRATEC AG, Brugg (CH)

( * ) Notice: Subject to any disclaimer, the term of this patent is extended or adjusted under 35 U.S.C. 154(b) by 225 days.

(21) Appl. No.: 16/318,982

(22) PCT Filed: Jun. 14, 2017

(86) PCT No.: PCT/EP2017/064532
§ 371 (c)(1),
(2) Date: Jan. 18, 2019

(87) PCT Pub. No.: WO2018/015075
PCT Pub. Date: Jan. 25, 2018

(65) Prior Publication Data
US 2019/0240905 A1 Aug. 8, 2019

(30) Foreign Application Priority Data
Jul. 20, 2016 (EP) .................................. 16180451

(51) Int. Cl.
B29C 64/255 (2017.01)
B33Y 10/00 (2015.01)
(Continued)

(52) U.S. Cl.
CPC ............ *B29C 64/255* (2017.08); *B22F 12/00* (2021.01); *B28B 1/001* (2013.01); *B29C 64/153* (2017.08);
(Continued)

(58) Field of Classification Search
CPC ... B29C 64/255; B29C 64/153; B29C 64/268; B33Y 10/00; B33Y 30/00; B22F 12/00; B28B 1/001
See application file for complete search history.

(56) References Cited

U.S. PATENT DOCUMENTS 5,106,288 A 4/1992 Hughes
5,837,960 A 11/1998 Lewis et al.
(Continued)

FOREIGN PATENT DOCUMENTS

DE 102011109411 A1 2/2013
EP 0435564 A2 * 7/1991 ............ B33Y 10/00
(Continued)

OTHER PUBLICATIONS

Conductive Transparent Film Heater as Alternative to Heating Table: Towards New Intelligent Mobile Accurate Thermo-Electrical (IMAT) Device for Structural Conservation of Paintings by Tomas Markevicius et al., published under URL: http://www.imatproject.eu/en/pld/conductive-transparent-film-heater-as-alternative-to-heating-table-towards-new-intelligent-mobile-accurate-thermo-electrical-imat-device-for-structural-conservation-of-paintings/23, downloaded on Jan. 14, 2019, 8 pages.

(Continued)

*Primary Examiner* — Yung-Sheng M Tsui
(74) *Attorney, Agent, or Firm* — Hard IP LLC (57) ABSTRACT An additive manufacturing device includes a beam generation unit, a raw material container and a raw material supply unit. A window element can transmit an energy beam emittable by the beam generation unit to the raw material container for manufacturing a solid article from multiple raw material layers. The raw material includes a powder. The raw material container contains a raw material arranged in multiple raw material layers arranged upon each other, where an uppermost raw material layer including a raw (Continued)

material surface is exposed to the energy beam. The window element includes a first surface and a second surface. The first surface faces the beam generation unit and the second surface faces the raw material surface. The second surface is at least partially covered by a protection element. The protection element is transparent for the energy beam such that in operation, the energy beam passes through the protection element.

13 Claims, 6 Drawing Sheets

(51) Int. Cl.
    *B33Y 30/00*     (2015.01)
    *B29C 64/153*     (2017.01)
    *B29C 64/20*     (2017.01)
    *B22F 12/00*     (2021.01)
    *B29C 64/268*     (2017.01)
    *B28B 1/00*     (2006.01)
    *B22F 10/10*     (2021.01)
(52) U.S. Cl.
    CPC ............ *B29C 64/20* (2017.08); *B29C 64/268* (2017.08); *B33Y 10/00* (2014.12); *B33Y 30/00* (2014.12); *B22F 10/10* (2021.01)

(56) References Cited

U.S. PATENT DOCUMENTS

| | | |
|---|---|---|
| 2012/0201960 A1 | 8/2012 | Hartmann et al. |
| 2015/0367573 A1 | 12/2015 | Okazaki et al. |
| 2017/0028589 A1* | 2/2017 | Capobianco .......... B01F 5/0685 |
| 2017/0087670 A1* | 3/2017 | Kalentics ............. B23K 26/342 |

FOREIGN PATENT DOCUMENTS

| | | | |
|---|---|---|---|
| EP | 0435564 B1 | 7/1991 | |
| EP | 2431113 B1 | 3/2012 | |
| WO | 1997006918 | 2/1997 | |
| WO | 2007009526 A1 | 1/2007 | |
| WO | WO-2007009526 A1 * | 1/2007 | ............ G02B 7/028 |
| WO | 2015091485 | 6/2015 | |

OTHER PUBLICATIONS

International Search Report for International application No. PCT/EP2017/064532, dated Aug. 31, 2017, 4 pages.

Written Opinion of the International Searching Authority for International application No. PCT/EP2017/064532, dated Aug. 31, 2017, 7 pages.

* cited by examiner

PROTECTION ELEMENT

CROSS-REFERENCE TO RELATED APPLICATIONS

This application is a U.S. national stage filing under 35 U.S.C. 371 of international patent application no. PCT/EP2017/064532, filed on Jun. 14, 2017, which claims priority to European patent application no. EP16180451.3, filed on Jul. 20, 2016, the contents of both of which are incorporated herein by reference in their entirety.

TECHNICAL FIELD

The invention relates to a protection element for a transmission surface for an energy beam for an additive manufacturing device. Such an additive manufacturing device can be configured as a selective sintering device for manufacturing three-dimensional solid articles.

DESCRIPTION OF RELATED ART

A device for layer-wise manufacturing of an object by laser sintering according to the prior art according to WO2007009526 A1 includes a container for a powder to be solidified by a laser beam directed onto its surface. The laser beam provides the energy source for solidifying a surface layer of the powder with in working plane in specific regions corresponding to a layer of the finished article. After completion of the solidification process in the working plane, an application device applies another layer of powder on top of the surface layer just completed. The container is movable to place the other layer at the level of the working plane. This layer is again exposed to the laser beam and the solidification process is repeated.

The laser beam is generated by a laser, which is deflected by a deflecting device that is controlled by a control device and is focused at a predetermined point within the working plane by a focusing device. The focusing device contains a lens module, which is an example of a coupling window. A coupling window is an example for a transmission surface for an energy beam. The lens module comprises an entry lens and an exit lens fitted onto a retaining ring. The exit lens is arranged at the side of the lens module facing the working plane. It is exposed to possible contamination resulting from decomposition and reaction products, which escape from the powder during the manufacturing process. Such decomposition and reaction products may deposit on the lens and thereby reduce the transparency successively in the course of the manufacturing process. This phenomenon is also referred to as fogging in the literature. To avoid such contamination, it is suggested in WO2007009526 A1 to increase the temperature of the exit lens. A heating element is provided, which is arranged on the circumference of the lens and may comprise a wire coiling which is heated by electrical resistance when a current flows through the wire coiling when connected to an electrical circuit. The heat is dissipated to the exit lens whereby the temperature of the exit lens rises up to more than 100 degrees Celsius. Thereby a condensation of the decomposition or reaction products on the cooler surface of the lens can be avoided. In addition, thereto or alternatively thereto, an inert gas flow can pass the lens or any safety window arranged between the lens and the working plane. An example of a device for providing a gas flow to carry any precipitates away from the lens is disclosed in WO9706918 A1.

None of the prior art solutions can up to now prevent fogging completely for a prolonged period of time. It has also been observed that even gaseous contaminants can deposit on a heated glass window and may burn on the hot surface, which may indeed accelerate contamination instead of slowing it down as suggested in WO2007009526 A1. Therefore, the prior art systems cannot prevent contamination satisfactorily in all cases.

Document EP 2431113 A1 discloses a shutter which prevents the powder material or fumes from adhering to the glass window. The shutter is made of a flexible noncombustible material such as a metal sheet. The shutter is closed only during the period of lowering or lifting the frame when the fumes are discharged, as the air flow becomes turbulent during this period. The fumes are scattered and would adhere to the window, which results in a contaminant deposit which results in a decreased output of the light beam. The shutter operates thus only when the light beam is inactive. There is no protection of the glass window during the operation of the light beam, therefore the glass window may still be contaminated during beam operation, even if the speed of contamination may be substantially decreased by the shutter disclosed in document EP2431113 A1. Thus, even the shutter of EP2431113 A1 requires periodic cleaning or replacement of the glass window.

It is mentioned in U.S. Pat. No. 5,106,288 A to use a transparent movable film to protect a glass window which is used to pass a laser beam onto a liquid polymer surface, which is to polymerize at the spots heated by the laser beam. However, the liquid polymer forms only one single layer on 2-dimensional product such as a credit-card or a 3-dimensional article such as a roof of a model skyscraper. A method for manufacturing a three-dimensional object from successive solidified layers from a deformable, photodeformable and liquid composition is also disclosed in EP 0 435 564 A2. A transparent film is placed by transparent plate on top of a previously formed solidified layer. The photodeformable composition is contained between the film and the platform and the film is thus positioned within the composition and is in direct contact with the composition. This flexible transparent film is transparent to radiation e.g. resulting from a laser beam. The film has to be placed on the surface of the solidified layers within the photodeformable composition to prevent the introduction of gas bubbles between a previously formed solidified layer and a solidified layer to be formed by application of radiation onto the photodeformable composition to form a newly solidified layer on top of the previously solidified layer. The film is removed from the newly solidified layer after its manufacture has been completed.

SUMMARY OF THE INVENTION

It is therefore an object of the invention to prevent contamination of a transparent window element for any building material used in an additive manufacturing process, which requires a layer-wise production of a 3-dimensional article.

The problem is solved by the invention by providing a protection element, which is transparent for the energy beam.

An additive manufacturing device comprises an energy beam generation unit, a raw material container and a raw material supply unit. A window element is provided for transmission of an energy beam emittable by the energy beam generation unit to the raw material container for manufacturing a solid article from a plurality of raw material layers. The raw material container contains a raw material arranged in a plurality of raw material layers arranged upon each other, such that an uppermost raw material layer including a raw material surface is exposed to the energy beam. The window element comprises a first surface and a second surface, whereby the first surface faces the beam generation unit and the second surface faces the raw material surface. The second surface is at least partially covered by a protection element. The protection element is thus arranged between the second surface and raw material disposed in the raw material container.

The raw material comprises a powder, which is dispensed into the target area in a layer-wise manner. The energy beam applied onto the powder in the target area can selectively sinter the powder to produce a sintered layer. The layers are joined together in a stepwise manner until the complete solid article is formed. The solid article can remain embedded in the powder until it is taken out from the raw material container and separated from the powder. The powder can be one of a plastic, metal, ceramic powder or a composite material.

According to an embodiment, a control unit operates to move the aim of the energy beam and modulates the energy beam, in particular a laser, to selectively sinter the layer of powder dispensed into the target area such that only the powder disposed within defined boundaries is sintered to produce the desired layer of the solid article, thus a portion of the solid article. The control unit includes a computer and a scanning system. The control unit also operates the energy beam to selectively sinter sequential layers of the raw material disposed upon each other, producing the solid article, which comprises a plurality of layers sintered together. The boundaries correspond to the cross-section of the portion of the solid article in the respective layer. The boundaries can be defined by a computer-generated model obtained from a CAD (computer-aided design) or CAM (computer-aided manufacturing) software. The transformation of the raw material into a solid article involves an at least partial local melting process of particles of the raw material by the thermal energy of the energy beam. By melting at least, the surface of the particles in the layer exposed to the energy beam, neighboring particles create a bond which solidifies as soon as the supply of thermal energy stops, that is when the energy beam is directed to another spot on the raw material surface.

The energy beam can be any type of beam capable of transporting energy to change the temperature of the raw material surface in a way that it alters its composition, for instance by performing a chemical reaction or by at least partially melting the particles of a powder, e.g. by sintering. Thus, the beam is an energy-transporting beam, i.e. an energy beam. In particular, the beam comprises a laser beam.

The raw material supply unit can comprise one of a doctor blade, a forward rotating roller or a counter-rotating roller. The raw material can be distributed by spreading the raw material over the raw material surface of the previous layer after completion of the previous solid layer portion of the solid article.

The protection element is transparent for the energy beam. The protection element can be movable relative to the window element. Thereby the protection element can be removed or exchanged without interfering with the manufacturing sequence. According to an embodiment, the protection element can perform a sliding movement, thus it can move in particular substantially parallel to the second surface of the window element.

According to an embodiment, the protection element comprises a sheet element. The sheet element can be removably attached to the window element, in particular to its second surface. A plurality of sheet elements can be provided, which can be exchanged for instance periodically or also upon detection of contamination. The advantage of using a sheet element, for instance a glass sheet, lies in the possibility to clean a contaminated sheet and re-use it.

According to an embodiment, the protection element is temperature resistant to at least 100 degrees Celsius. Thereby it is possible to increase the temperature in the space between the raw material surface and the protection element, which may reduce thermal stress in the solid article manufactured and/or may allow increasing productivity.

According to an embodiment, the protection element comprises a foil. The foil can be in particular temperature resistant, for instance the foil may be capable of withstanding a temperature of at least 100 degrees Celsius. The temperature resistant foil remains unaffected by temperature for a period of at least 15 minutes, preferably for at least 30 minutes.

The protection element can be attached to the second surface at least for the time of operation of the energy beam to produce at least a layer of the solid article.

According to an embodiment, the protection element can be attached by an electrostatic force. Depending on the weight of the protection element and/or the required attraction force, the electrostatic force can be one of a natural electrostatic force or an artificially enhanced electrostatic force.

According to an embodiment, a suction force can be applied to the protection element. The protection element may be attached to the second surface of the window element by applying a sub-atmospheric pressure at least at some points of the second surface.

The foil can be supplied on rollers and continuously or intermittently moved. The foil covers at least the surface of the transparent window element. In particular, the foil can be flexible for storing it on roller elements and supplying it by roller elements. The roller elements can be configured as cylindrical roller elements.

According to an embodiment, the protection element can be flexible. Thereby it is possible to tension the protection element, such that it is attached to the second surface at least for the time of operation of the energy beam to produce at least a layer of the solid article.

According to an embodiment, a pressurizing force can be applied onto the protection element by a pressurizing element. The protection element can be pressed by the pressurizing element onto the second surface of the window element. The pressurizing element can be configured as a frame element. The protection element can be arranged between the frame element and the window element. The frame element can be moved to the second surface of the window element, thereby squeezing the protection element, which is thereby pressed against the second surface.

According to an embodiment, the protection element comprises at least one of PTFE (polytetrafluorethylene) or ETFE (ethylene tetrafluoroethylene).

According to an embodiment, the window element and/or the protection element includes a heating surface for heating the raw material surface to form a pre-heated raw material surface. The energy beam generated by the beam generation unit can pass through the heating surface onto the pre-heated raw material surface.

According to an embodiment, one of the window element and/or the protection element includes a borosilicate glass. Borosilicate glass provides the additional advantage of being resistant to large temperature differences, in particular also to thermal shocks. Borosilicate glass is therefore a particular advantageous material to add to, to integrate into or to use for a heating surface. In particular, the heating surface can consist of borosilicate glass.

According to an embodiment, the beam generation unit comprises a control unit. The energy beam is emittable by the beam generation unit according to the instructions of the control unit. The beam generation unit can comprise a directing unit to direct the beam onto the pre-heated raw material surface according to a computer-generated model of the solid article stored in a storage unit associated with the control unit.

According to an embodiment, the beam generation unit is movable relative to the raw material surface, such that the angle of the beam relative to the raw material surface substantially remains constant. Thereby the manufacturing precision can be increased because the spot of the energy beam on the raw material surface is of a defined shape.

According to an embodiment, the beam generation unit is movable. Thereby the position of the beam on the directing unit can be varied. The movement of the beam generation unit can be controlled by the control unit. In particular, the control unit can control the movement of the beam generation unit in accordance with a model of the solid article stored in a storage unit. The dimensions of the model of the solid article are transformed into a path of motion of the beam generation unit. Thereby the position of beam on the directing unit is varied which results in a variation of the position of the deflected beam on the raw material surface or the preheated raw material surface. The angle of the energy beam relative to the raw material surface or the pre-heated raw material surface is advantageously 90 degrees with a deviation of not more than 5 degrees.

According to an embodiment, the directing unit is movable. The beam generation unit can remain in a fixed position or can be movable together with or independently of the directing unit. The movement of the directing unit can be controlled by the control unit. In particular, the control unit can control the movement of the directing unit in accordance with a model of the solid article stored in a storage unit. The dimensions of the model of the solid article are transformed into a path of motion of the directing unit. Thereby the position of beam on the directing unit is varied which results in a variation of the position of the deflected beam on the raw material surface or the preheated raw material surface.

According to an embodiment, the directing unit comprises a first redirection element and a second redirection element. In particular, at least one of the first redirection element and the second redirection element is movable. The directing unit can comprise a mirror of polygonal shape, i.e. a polygonal mirror. The polygon can be a hexagon or any polygon with more than six faces. The mirror of polygonal shape can be rotatable. Thereby the position of the beam on the second redirection element can be changed, which results in a variation of the position of the deflected beam on the raw material surface or the preheated raw material surface. At least one optical element, such as a lens, can be foreseen in the path of the beam between the beam generation unit and the directing unit. Furthermore, one or more optical elements can be provided in the path of the beam from the second redirection element to the heating element and/or the raw material surface.

According to an embodiment, the protection element is in contact with the raw material surface at least during the period of operation of the beam for creation of the solid article. Thereby the emission of dust can be prevented. In addition, the raw material surface can be leveled in particular if the protection element comprises a planar sheet element, such that the raw material surface is exactly horizontal and exactly planar.

According to an embodiment, the protection element is arranged at a first distance to the raw material surface during operation of the energy beam and the protection element is arranged at a second distance to the raw material surface after the exposition of the raw material surface to the energy beam or before the exposition of the raw material surface to the energy beam, whereby the first distance can be smaller than the second distance. The protection element can thus be moved towards the raw material surface and away therefrom. In particular, if the protection element or the window element contains a heating surface, the distance to the raw material surface can be reduced during the heating period, to minimize heat transfer losses due to an air gap between the protection element and the raw material surface. Thereby, a more uniform distribution of the heat is possible, such that the raw material surface can be preheated evenly. Thereby any hot spots in any particular area of the raw material surface can be avoided.

A method for operating an additive manufacturing device for manufacturing a solid article by an additive manufacturing method, comprising a beam generation unit, a raw material supply unit, a raw material container, comprises a first step in which an energy beam is emitted by the energy beam generation unit and is transmitted through a window element arranged in the path between the beam generation unit and the raw material container, whereby the raw material container contains a raw material arranged in a plurality of raw material layers arranged upon each other, such that an uppermost raw material layer including a raw material surface is exposed to the energy beam. In other words, the energy beam impinges on a surface layer disposed in the raw material container for manufacturing a solid article. The window element comprises a first surface and a second surface, whereby the first surface faces the beam generation unit and the second surface faces the raw material container. The second surface is at least partially covered by a protection element, such that, when the energy beam hits raw material surface, such that the surface layer is transformed, e.g. sintered or solidified at the spot, any by-product deposits on the protection element. The by-product thus does not deposit on the second surface of the window element or any heating surface. The by-product can comprise one of a gaseous, liquid or particulate by-product. The by-product can also comprise the raw material in a fluidic state that means in particular a powder present as dust in the air or a gas in an intermediate space between the protection element and the raw material surface. The gas can comprise volatile reaction products emitted by the solidification process.

In an optional second step, the protection element, which is contaminated by the by-products, can be removed and be replaced by a new protection element.

In a further optional third step, the window element comprises a heating surface for heating the raw material surface in the raw material container, whereby the raw material is pre-heated by the thermal energy generated by the heating surface to from a pre-heated raw material surface, in a second step, an energy beam is generated by the beam generation unit, in a third step a directing unit directs the energy beam emitted by the beam generation unit onto the pre-heated raw material surface, whereby the energy beam is directed over the pre-heated raw material surface according to a computer generated model of the solid article stored in a storage unit associated with the control unit, whereby the energy beam is directed through the heating surface and the protection element onto the pre-heated raw material surface such that a first solid layer portion of the solid article is obtained when directing the energy beam onto the pre-heated raw material surface, and in at least one subsequent step a second layer of the raw material is supplied from the raw material supply unit and deposited on top of the first layer, wherein, in at least one optional further subsequent step, the operations performed in the previous steps are repeated until the solid article is obtained.

When the energy beam travels over the pre-heated raw material surface, the angle of the energy beam relative to the raw material surface can substantially remain constant.

A scanning system can include a prism for redirecting the path of travel of the energy beam and a pair of mirrors driven by respective galvanometers. The energy beam is directed onto the raw material surface and selectively solidifies the spots on this raw material surface according to a pre-described shape, which is usually generated by the design of a 3D model of the solid article. The 3D model is composed of an infinite or at least very large number of surface points or pixels. By defining a sectional plane corresponding to the working layer of the additive manufacturing device, a section curve or a section plane is generated. If the 3D model is a computer-generated shape, the section curve or section plane is a computer-generated spline or planar object. This planar object is defined by a plurality of coordinate pairs. In case of use of a Cartesian coordinate system, the spline or planar object is defined by a plurality of coordinate pairs defining the location of the section curve or section plane in the x, y direction. The z direction is constant for a section curve and corresponds to the position of the layer in the printer. The z coordinate increases with every layer completed. Thus, the solid body is completely manufactured if its height, thus the largest value of the z-coordinate of the 3D model is reached.

The distance between the raw material surface and the protection element can correspond to at least the thickness of the uppermost raw material layer at least during the period of recreation of a subsequent uppermost raw material layer. The distance between the raw material surface and the protection element can correspond to at most thousand times of the thickness of the uppermost raw material layer. Advantageously the distance between the raw material surface and the protection element corresponds to at most fifty times of the thickness of the uppermost raw material layer. According to this embodiment, a raw material distribution unit may be arranged or may be passed between the uppermost raw material layer and the protection element for distribution of the raw material for the subsequent raw material layer.

The smaller the distance between the raw material surface and the heating surface, the better the heat transfer can be controlled. The smaller the overall volume becomes, the faster the space between the heating surface and the raw material surface can be heated.

Therefore, the energy consumption can be considerably reduced. This synergistic effect of the distribution of the heat generated by the energy beam and the sintering process may lead to an unexpected decrease in energy consumption with respect to prior art additive manufacturing devices.

The additive manufacturing device can be one of a laser-sintering device, a laser melting device, a mask sintering device, a drop-on powder device, a drop on bed device, a stereolithographic device.

Advantageously the wavelength of the energy beam can be in the range from ultraviolet light to far infra-red light, thus from about 100 nm up to and including 1 mm of wavelength. Ultraviolet light thereby lies in a range of less than 100 nm up to and including about 380 nm of wavelength. Far infra-red light thereby lies in a range of about 30 µm up to and including about 1 mm of wavelength.

According to an embodiment, the wavelength can be in the range from visible light to mid-infra-red light, thus from about 400 nm up to and including 30 µm of wavelength. Visible light thereby lies in a range of less than 400 nm up to and including about 750 nm of wavelength. Mid-infra-red light thereby lies in a range of more than 3 µm up to and including about 30 µm of wavelength. In this range, a $CO_2$ laser can advantageously be employed.

According to a preferred embodiment the wavelength can be in the range from visible light to near-infra-red light, thus from less than about 400 nm up to and including 3 µm of wavelength. Visible light thereby lies in a range of less than 400 nm up to and including about 750 nm of wavelength. Near-infra-red light thereby lies in a range of more than 750 nm up to and including about 3 µm of wavelength.

According to an embodiment, the heating surface is transparent for an energy beam, in particular of a diode laser. In particular, the heating surface is transparent for light of a wavelength in the range of 300 nm up to and including 1100 nm, preferably of a wavelength in the rage of 400 up to and including 950 nm, particularly in a preferred range of 445 nm up to and including 808 nm. An advantage to use a laser in the visible spectrum is that it makes optical adjustments during the additive manufacturing process safer. Conveniently, a diode laser can be used, which can comprise a semiconductor based on any one of the following base compounds: AlN, GaN, SiC, InN, BeSe, ZnS, MgS, MgSe, BeTe, ZnSe, AlP, GaP, AlAs, ZnTe, CdSe, GaAs, InP, Si, Ge or combinations of these materials, such as InGaAlP, GaAlAs, InGaAs, InGaAsP. In particular, a blue laser can be used. The power of the laser can be conveniently in a range of 0.1 W up to 100 W. Advantageously, a laser operating in the blue range of the spectrum is used. According to a particularly preferred example, one or more blue lasers of 2.3 W are used. Alternatively, a $CO_2$ laser can be used, whereby the base compound of a $CO_2$ laser is carbon dioxide.

According to an embodiment, the heating surface can contain a heating element. The heating element can extend essentially along the circumference of the heating surface. According to a further embodiment, the heating surface can contain a plurality of heating elements. According to an embodiment, the heating surface can comprise a sensor element, in particular a temperature sensor element or can be a sensor element. By providing an independent temperature control for any of the heating surfaces, the temperature of the pre-heated raw material surface can be kept substantially constant. In particular, the variation of the temperature over the pre-heated raw material surface can be less than 4 degrees Celsius, more preferably less than 2 degrees Celsius, most preferred less than 1 degrees Celsius.

In particular, the boundary regions of the raw material, i.e. the raw material close to the wall of the raw material container tend to be colder than the core regions and the previously sintered regions tend to be hotter. For this reason, a multi-zone heating surface according to the configuration as set out in the previously described embodiment can be particularly of advantage as any zone can contain individual sensors and individually controlled heating elements.

According to an embodiment, the heating surface or the protection element comprises a nonstick coating, such as a polytetrafluorethylene (PTFE) or ethylene tetrafluoroethylene (ETFE). The protection element can be in contact with the heating surface. Thereby heat is transmitted by conduction and losses due to convective heat transfer are essentially eliminated if such a configuration is used.

The heating surface or the protection element can contain at least one the elements of the group of a transparent conductive oxide (TCO), a network of nanowires, of nanotubes or a glass material. According to an embodiment, the heating surface or the protection element contains a transparent conductive oxide, such as for example indium tin oxide at least for a segment, which requires a substantial transmittance for the beam. Alternatively or in addition thereto, the heating surface or the protection element can contain a network of nanowires. The structure of nanowires can in particular include thermally and/or electrically conducting materials, such as metals. In particular, a structure containing Ag, Au nanowires can be used. These nanowires can be embedded in a resin so to enhance thermal conductivity of such a resin. According to another variant, an intelligent mobile accurate thermo-electrical device, also known as IMAT can be used as a heating surface. Such an IMAT heating surface comprises a conductive transparent heater. A material employed for such an IMAT heating surface can be carbon nanotube. A thin, lightweight, transparent heating surface can be obtained. The surface may be stretchable or flexible, thus may be adaptive to variable geometrical dimensions of the solid article and the raw material container to be used. Conductive films made with carbon nanotubes and metal nanowires, in addition to their low sheet resistance, possess an optical transmittance in the visible spectrum and can form electrically conductive, yet almost completely transparent films, measuring only about 50-100 nanometers thick. The conductive film can be placed on a glass or plastics substrate, such as a PET or polycarbonate substrate.

According to an embodiment, the heating surface or the protection element can include a glass material, in particular one of the group of magnesium fluoride ($MgF_2$), a sapphire, a calcium fluoride ($CaF_2$), barium fluoride ($BaF_2$), zinc selenide (ZnSe), silicon (Si), a silicon dioxide (silica, $SiO_2$), a borosilicate, germanium (Ge), iridium (Ir) potassium bromide (KBr), sodium chloride (NaCl) or zinc sulfide glass. The glass material can also comprise combinations of these materials, in particular, the glass can be composed of a plurality of layers of different composition, wherein at least one of the layers contains one of the group of compounds named in the previous sentence.

In particular, any of the above glass materials may be used for obtaining a high transmittance for a $CO_2$ laser through the heating surface. Under transmittance, it is to be understood the percentage of laser light passing through the heating surface. A transmittance of 80% or more means that at least 80% of the laser is transmitted through the heating surface. A transmittance of 90% means that at least 90% of the laser is transmitted through the heating surface. A transmittance of 95% means that at least 95% of the laser is transmitted through the heating surface. The laser can be in particular a $CO_2$ laser or a diode laser comprising any of the base compounds mentioned earlier.

According to an embodiment, the heating surface or the protection element can comprise a conductive film, e.g. a conducting film containing any of the materials of the group of a transparent conductive oxide (TCO), a network of nanowires, nanotubes or of a glass material. The conductive film can also be placed on an elastic polymer to provide a configuration of an adjustable heating surface. According to a further embodiment, a multifilament yarn containing carbon nanotubes can be woven to form a textile or fabric heating surface. In particular the heating surface can be configured according to the publication CONDUCTIVE TRANSPARENT FILM HEATER AS ALTERNATIVE TO HEATING TABLE: TOWARDS NEW INTELLIGENT MOBILE ACCURATE THERMO-ELECTRICAL (IMAT) DEVICE FOR STRUCTURAL CONSERVATION OF PAINTINGS by Tomas Markevicius et al, published under http://www.imatproject.eu/en/pld/conductive-transparent-film-heater-as-alternative-to-heating-table-towards-new-intelligent-mobile-accurate-thermo-electrical-imat-device-for-structural-conservation-of-paintings/23.

According to an embodiment, a heating device can be provided, which comprises a heating surface and heated surface. The heated surface can be heated by the heating surface. The heated surface can be foreseen between the heating surface and the pre-heated raw material surface. The heated surface receives thermal energy from the heating surface, whereby the temperature of the heated surface increases. In other words, the heated surface is passively heated. The heated surface can be in contact with protection element and transmits the thermal energy received from the heating surface through the protection element to the raw material surface to form a pre-heated raw material surface which is suitable for generating a layer of a solid article by application of a beam onto a selected portion of the pre-heated raw material surface. The heated surface may or may not be transmissive to the beam, in particular the energy beam, for instance laser light. If not, it is placed outside the beam path.

According to an embodiment, a compression force can be applied onto the raw material by pressing the raw material surface against a pressurizing device. In other words, the raw material is compressible by a pressurizing device. The pressurizing device can be arranged in the raw material supply unit and/or in the transparent window element or the protection element or can comprise at least one of those units or elements. In case, that pressure is to be applied onto the raw material by the pressurizing device, the protection element is pressed upon the surface of the raw material to generate a pre-compressed and optionally pre-heated raw material surface.

According to an embodiment, the raw material comprises a powder. The powder can contain a polymer, in particular a polyamide with a surface melting temperature greater than 170 degrees Celsius at ambient pressure conditions, which undergoes a sintering process upon exposure to the laser beam. The powder can contain one compound of the group of a polycarbonate (PC), a polymethylmethacrylate (PMMA), a polystyrene (PS), a high-density polyethylene (PE-HD), a polyamide (PA) or a polyaryletherketone (PEEK). In particular, the powder can contain one of the compounds of the group of a PA11 or PA12 or PEEK. The powder can contain pigments or other additives in particular for enhancing light absorption. The powder can in particular contain carbon black. Furthermore, the powder can contain a metal, e.g. aluminum. The powder can contain a ceramics material.

The energy beam can be exposed for a period of less than a millisecond at a spot and subsequently directed to an adjacent spot for sintering or melting the pre-heated raw material surface at the adjacent spot for any of the embodiments. In particular, the beam proceeds at a speed of at least 50 mm/s, in particular at least 100 mm/s, preferably at least 180 mm/s, particularly preferred at least 1000 mm/s over the pre-heated raw material surface. In particular, the temperature at the spot is at least 0.5° C. above the temperature of the pre-heated raw material surface.

BRIEF DESCRIPTION OF THE DRAWINGS

The invention will be explained in more detail in the following with reference to the drawings. There are shown in a schematic representation in.

DETAILED DESCRIPTION

Figure 1:
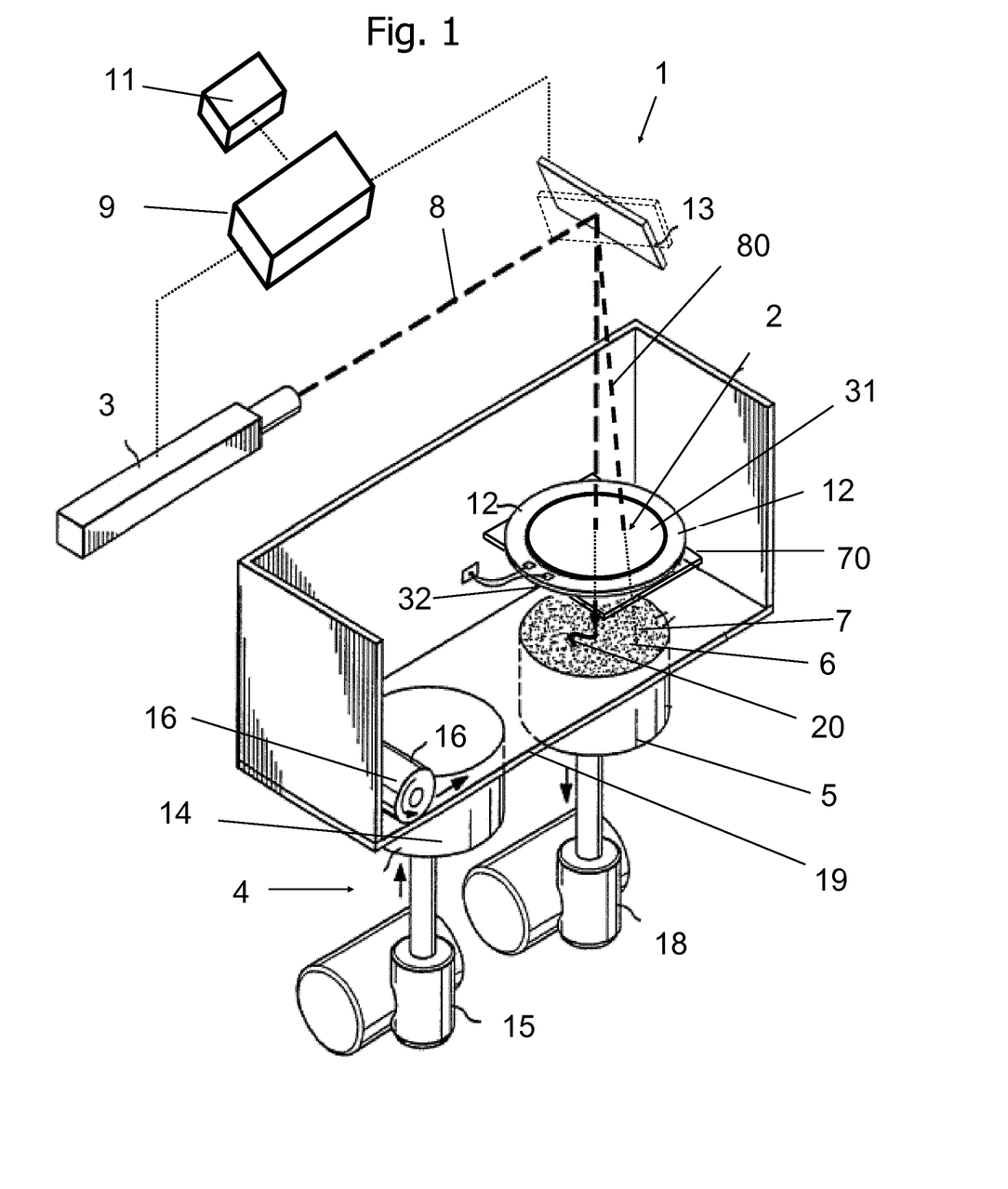
FIG. 1 a perspective view of an additive manufacturing device including a protection element FIG. 2 a view on the assembly of a window element, a protection element and a raw material container according to a first embodiment of the invention, FIG. 3 a view on the assembly of a window element, a protection element and a raw material container according to a second embodiment of the invention, FIG. 4 a view on the assembly of a window element, a protection element and a raw material container according to a third embodiment of the invention, FIG. 5 a schematic view of an additive manufacturing device according to a fourth embodiment of the invention, FIG. 6*a* a schematic view of an additive manufacturing device according to a fifth embodiment showing a first step of a method for generating a new layer, FIG. 6*b* a schematic view of an additive manufacturing device according to the seventh embodiment showing a second step of the method, FIG. 6*c* a schematic view of an additive manufacturing device according to the seventh embodiment showing a third step of the method, FIG. 6*d* a schematic view of an additive manufacturing device according to the seventh embodiment showing a fourth step of the method, FIG. 6*e* a schematic view of an additive manufacturing device according to the seventh embodiment showing a fifth step of the method, FIG. 6*f* a schematic view of an additive manufacturing device according to the seventh embodiment showing a sixth step of the method, FIG. 6*g* a schematic view of an additive manufacturing device according to the seventh embodiment showing a seventh step of the method.

FIG. 1 shows a perspective view of a portion of an additive manufacturing device 1 including a protection element 70 for manufacturing a solid article 10. The additive manufacturing device 1 comprises a beam generation unit 3, in particular a diode laser generation unit, a raw material supply unit 4 and a raw material container 5 containing a raw material 6. The raw material 6 has a raw material surface 7 exposed to an energy beam 8 to be emitted by the beam generation unit 3 when it is operated. The operation of the beam is controlled by a control unit 9. A window element 2 is provided for the passage of the energy beam 8, which is arranged in a ceiling section, which is not shown in FIG. 1. The window element 2 can include a heating surface 12 to provide thermal energy to the raw material surface 7 to form a pre-heated raw material surface 17. The window element has a first surface 31 facing a directing unit 13 and a second surface 32 facing the protection element 70. The beam generation unit 3 is disposed with the directing unit 13 to direct the energy beam 8 onto the raw material surface 7 according to a computer-generated model of the solid article 10 stored in a storage unit 11 associated with the control unit 9. The operation of the directing unit 13 is controlled by the control unit 9. The directing unit 13 comprises in this embodiment a rotatable mirror, such as a galvanometer. The energy beam 8 generated by the beam generation unit 3 traverses the window element 2 onto the pre-heated raw material surface 17. The heating surface 12 of the window element 2 can be disposed with an opening for the passage of the energy beam 8 or can be transparent for the energy of the beam 8, in particular for a laser beam of a diode laser. Advantageously the heating surface 12 is transparent for light of a wavelength in a range of 100 nm up to and including 1 mm. The window element 2 and/or the heating surface 12 are at least partially covered by a protection element 70. The protection element 70 is arranged between the window element 2 and the raw material surface 7 or the pre-heated raw material surface 17.

By rotation of the mirror of the directing unit 13, any point on the surface of the raw material surface 7 can be reached. However, as shown in an alternative position of the mirror shown in dotted lines, the angle of impact of the beam on the raw material surface changes. Ideally, in the center of the raw material surface 7, the angle of impact between the beam 8 and the raw material surface is about 90 degrees.

The generation of a solid article 10 by an additive manufacturing method performed by the additive manufacturing device involves the following steps. A raw material is supplied as a layer of a thickness of less than 1 mm by the raw material supply unit 4. According to a preferred embodiment, the thickness or height of the layer was about 100 μm. The raw material supply unit 4 can include a raw material supply container 14, which is filled with raw material. The raw material supply container 14 is movable in a direction normally to the plane containing the layer of raw material for manufacture of the solid article by the additive printing method. The raw material supply unit 4 includes a drive unit 15 for moving the bottom of the raw material supply container 14 in a stepwise manner. For the generation of each new layer, the bottom of the raw material supply container 14 is moved a step upwards such that a volume corresponding to the thickness of a new layer is supplied to the raw material chamber 20 connecting the raw material supply container 14 and the raw material container 5. The raw material chamber 20 is shown in FIG. 1 in a partially opened state, thus the front wall and the covering wall thereof have been omitted in the drawing to show the elements of the raw material handling units comprising the raw material supply unit 4 and the raw material container 5. Once the bottom of the raw material supply container 14 is moved a step upward, the raw material for a second layer is provided. The raw material is distributed on the surface of the first layer for which the additive manufacturing process has already been completed. A raw material distribution unit 16 is provided for distributing the raw material in the raw material chamber 19. The raw material distribution unit 16 can in particular be configured as a roller. The raw material distribution unit 16 can perform a sliding or rolling movement along the chamber bottom of the raw material chamber 19. The raw material distribution unit 16 thereby pushes the volume of raw material supplied for generation of the second layer to the raw material container 5. The raw material container 5 or the raw material 6 and the portion of the solid article 10 embedded in the raw material is also movable in a direction normal to the chamber bottom of the raw material chamber 19. In particular, a drive unit 18 can be provided for allowing the raw material container to move away from the bottom of the raw material chamber 19, which is in this drawing corresponding to a downward movement. The raw material is distributed on the surface of the first layer or preceding layer for which the additive manufacturing process has already been completed.

The window element 2 according to this embodiment is of a circular cross-section corresponding to the cross-section of the cylindrical raw material container. The window element 2 contains in this embodiment a first surface 31 and a second surface 32. The window element can contain a heating surface 12, which is transparent to the energy beam 8, such that the energy beam 8 can pass through the heating surface 12. The heating surface 12 can contain a radiation heater or a resistance heater. The energy beam 8 generated and emitted by the beam generation unit 3 is directed by a directing unit 13 onto the raw material surface 7 or the pre-heated raw material surface 17. The energy beam can travel at a speed of at least 50 mm/s over the raw material surface 7 or the preheated raw material surface 17 and sinters or solidifies the raw material surface 7 or the pre-heated raw material surface 17 at the spots of contact.

The energy beam 8 is directed over the raw material surface 7 or pre-heated raw material surface 17 or the raw material surface 7 according to a computer-generated model of the solid article 10 stored in a storage unit 11 associated with the control unit 9. The energy beam 8 travels through the window element 2 and/or heating surface 12 and through the protection element 70 onto the raw material surface 7 or the pre-heated raw material surface 17 such that a first solid layer 20 of the solid article 10 is obtained when directing the energy beam 8 onto the raw material surface 7 or the pre-heated raw material surface 17. In at least one subsequent step, a second layer of the raw material is supplied from the raw material supply unit and deposited on top of the first layer. This subsequent step can be repeated until the solid article is obtained by adding the solid layers 20 one upon each other.

The raw material container 5 is successively moved downwardly by the drive unit 18. After completion of the last solid layer, the printing process of the solid article is completed. The solid article is embedded in the raw material 6. The raw material container 5 is extracted from the printing device 1; the unused raw material is removed therefrom and may be refilled into the raw material supply container 14 for manufacturing another solid article. The solid article 10 is thus separated from the raw material 6, which may be re-used.

Figure 2:
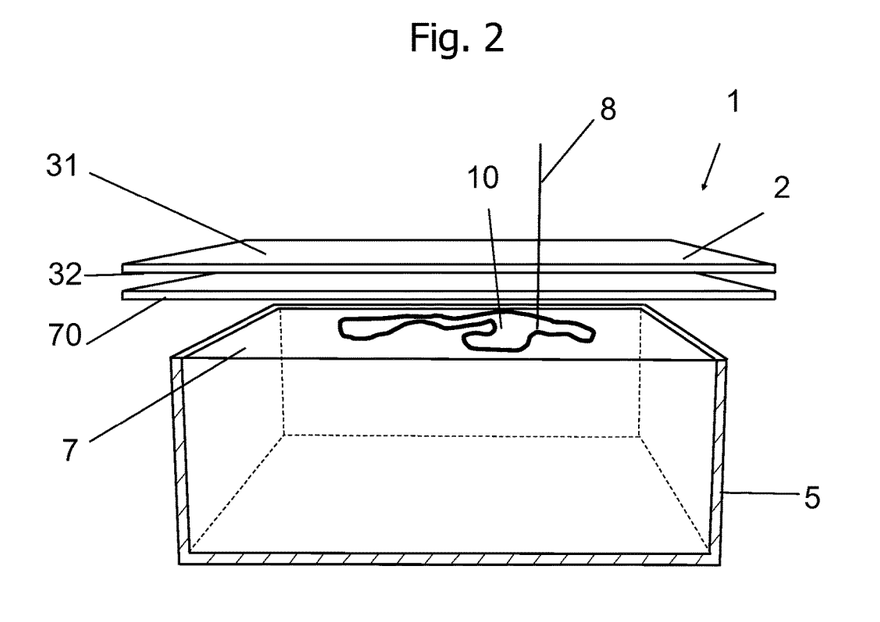
Figure 3:
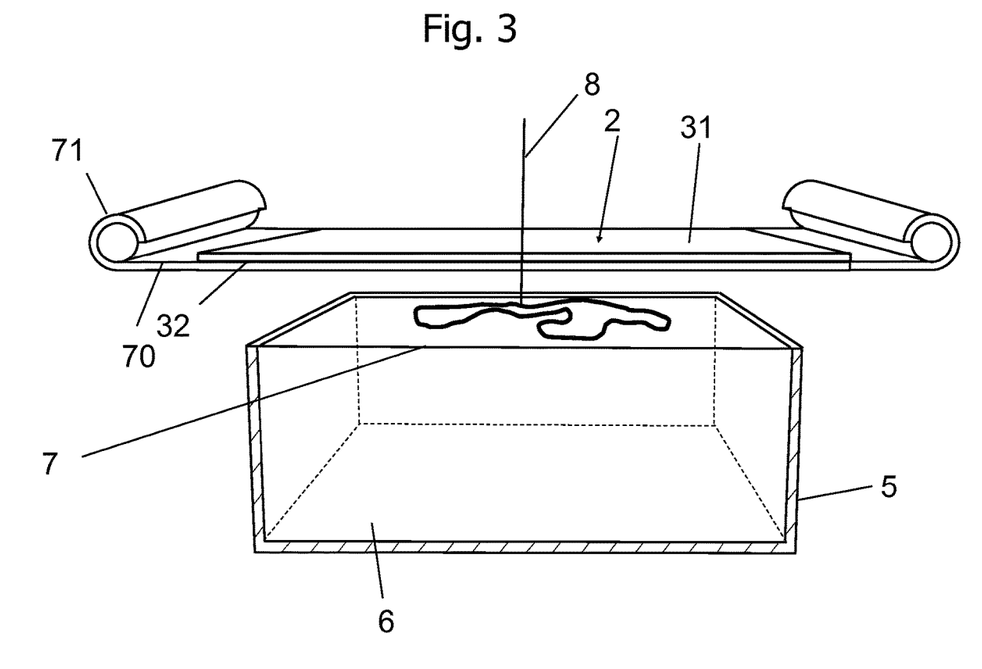
Figure 4:
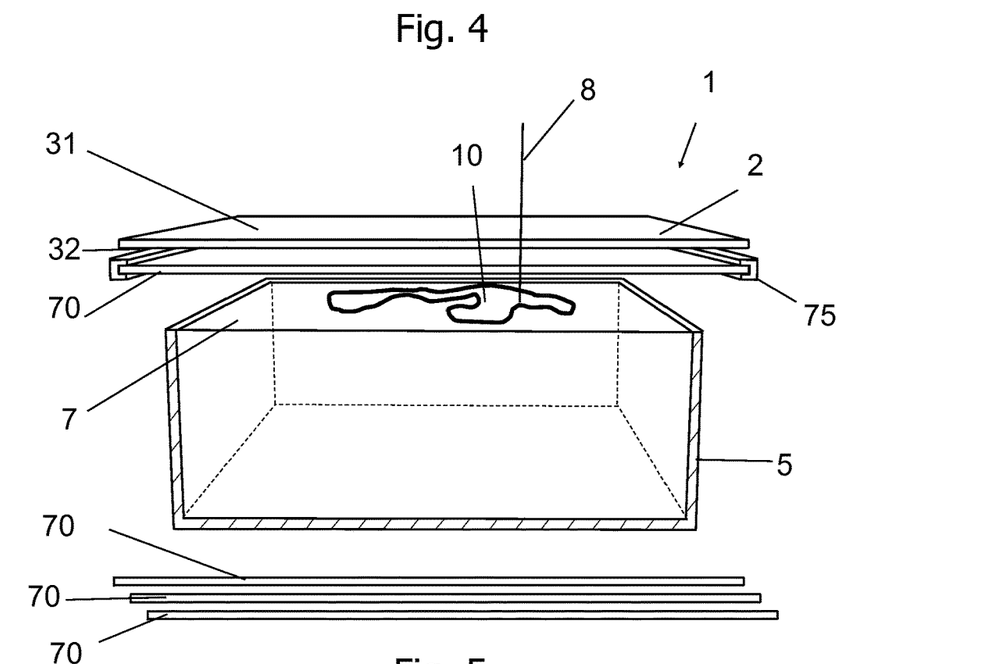

According to the embodiment shown in FIG. 2, FIG. 3 and FIG. 4, the window element 2 is configured as a plate element. The window element 2 has a first surface 31 and a second surface 32. The raw material container 5 and the window element 2 can be configured as a closed system. The drive unit 15 has been omitted from FIG. 2 as well as any details of the movable bottom wall of the raw material container 5. The raw material 6 containing the portion of the solid article 10, which has already been completed, fills the raw material container 5 up to the raw material surface 7 or the preheated raw material surface 17. A space is foreseen between the raw material surface 7 and the window element 2. The volume of this space is defined by the raw material surface 7 and the distance between the raw material surface and the window element 2. The volume can correspond to a cylinder, if the raw material surface is circular or can correspond to a cube, if the raw material surface is of rectangular shape. The protection element 70 is arranged in this volume. The distance between the raw material surface 7 and the protection element 70 can correspond to at least the thickness of the uppermost raw material layer.

According to any of the preceding embodiments, the distance between the protection element 70 and the raw material surface 7 can be less than 200 mm. By the term distance, it is to be understood the distance measured in a direction normal to the plane containing the protection element 70. The raw material container 5 is movable by the drive unit 18 in a direction normal to the raw material surface 7 or the pre-heated raw material surface 17, such that the distance between the protection element 70 and raw material surface 7 or the pre-heated raw material surface 17 can be kept constant.

According to an embodiment not shown in the drawings, the protection element 70 can be movable with respect to the raw material surface 7.

FIG. 3 shows the assembly of the window element 2, the raw material container 5 and a protection element 70 according to a second embodiment of the invention. The protection element 70 is a foil 71, which can be supplied by supply roller element 72 and removed by discharge roller element 73. The foil covers the second surface 32 of the window element 2. During operation, contaminating by-products deposit on the surface of the foil exposed to the raw material surface 7 or the pre-heated raw material surface 17. When the production of the solid article 10 is completed or the foil is too contaminated as not to allow a further production with the required precision, the portion of the foil exposed to the raw material surface or pre-heated raw material surface is advanced to the discharge roller element 73, where it is stored. The empty supply roller element 72 and the full discharge roller element 73 can be removed and substituted by a new full supply roller element 72 and empty discharge roller element 73 containing a clean foil.

FIG. 4 shows the assembly of the window element 2, the raw material container 5 and a protection element 70 according to a third embodiment of the invention. The protection element 70 is configured as a plate element, which can be one of a plurality of plate elements. The protection element 70 is received in a guide element 75. The protection element 70 can be removed from the guide element 75 when contaminated and replaced by a new protection element 70. A plurality of replacement protection elements can be held in storage. Thereby the protection element 70 can by replaced anytime and production needs not to be stopped or be stopped only for the time required to replace the protection element 70.

Figure 5:
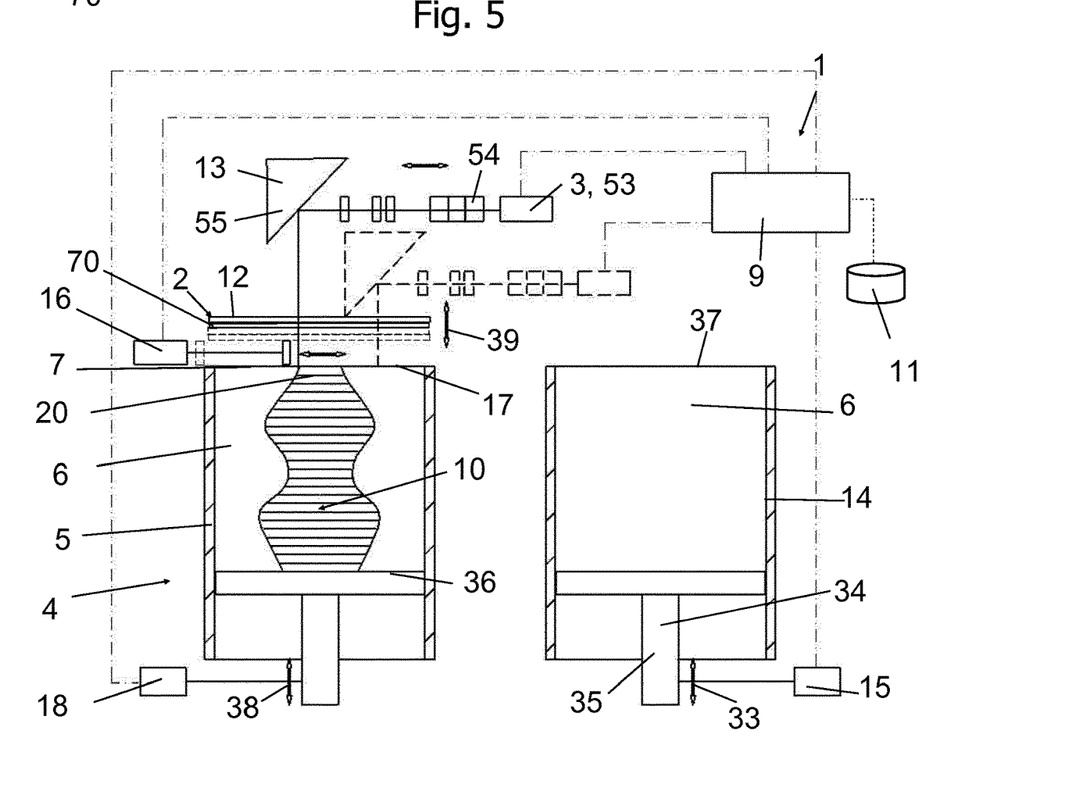

FIG. 5 shows a schematic view of an additive manufacturing device according to a fourth embodiment of the invention. The elements, which have the same function as in any one of the preceding embodiments, carry the same reference numbers. An additive manufacturing device 1 includes a window element 2 for manufacturing a three-dimensional solid article 10 in an additive manufacturing sequence. The additive manufacturing device comprises a beam generation unit 3, in particular a diode laser generation unit, a raw material supply unit 4 and a raw material container 5 containing a raw material 6. The raw material 6 includes a raw material surface 7 exposed to an energy beam 8 to be emitted by the beam generation unit 3 when it is operated. The operation of the energy beam 8 is controlled by a control unit 9. The beam generation unit 3 is disposed with a directing unit 13 to direct the energy beam 8 onto the raw material surface 7 according to a computer-generated model of the solid article 10 stored in a storage unit 11 associated with the control unit 9. Thereby the operation of the directing unit 13 is controlled by the control unit 9. The energy beam 8 generated by the beam generation unit 3 passes through the window element 2 onto the raw material surface 7. Thus, the energy beam 8 travels through the window element 2 and the protection element 70. In particular, the window element 2 and the protection element 70 are transparent for the beam. Advantageously the window element 2 and the protection element 70 transparent for light of a wavelength in a range of 100 nm up to and including 1 mm.

The beam generation unit 3 is according to this embodiment comprises according to this embodiment a movable beam source 53. A laser beam 8 is emitted by the generation unit 3, which is movable. Thus, the generation unit 3 is configured as a movable beam source 53. The beam 8 is redirected by a directing unit 13 composed of a first redirection element 54 and a second redirection element 55 onto the raw material surface 17. Thereby the energy beam 8 passes the window element 2 and the protection element 70, which can be of any configuration as mentioned in connection with the previous embodiments. The directing unit 13 can be stationary. The beam source 53 can be moved in a plane, which is parallel to the raw material surface 7. The first redirection element 54 has a surface, which receives the energy beam 8 and redirects the energy beam 8 onto a surface of the second redirection element 55. The second redirection element is positioned above the window element 2, such that any energy beam arriving at the surface of the second redirection element 55 is redirected through the window element 2 and the protection element 70 into a process chamber 60, which can be open or closed. The process chamber 60 contains the raw material container 5 and the raw material 6, which is stored in the raw material supply container 14. If the process chamber 60 is closed, the temperature in the process chamber 60 can differ from the temperature outside of the process chamber, in particular the temperature in the process chamber 60 can be higher than the temperature outside, such that the raw material surface can be kept at the desired processing temperature, e.g. by foreseeing a heating surface 12 according to any of the preceding embodiments.

The first and second redirection elements 54, 55 are shown with planar redirection surfaces for redirecting the beam to the raw material surface 7 or the pre-heated raw material surface 17. The surfaces could also be provided with a curvature.

The generation of a solid article 10 by an additive manufacturing method performed by the additive manufacturing device involves the same steps as discussed in connection with FIG. 1. In particular, a piston-shaped lifting unit 34 can be provided in the raw material supply container. The piston shaped lifting unit 34 includes the bottom of the raw material supply container and a rod member 35 attached thereto. The direction of movement of the lifting unit 34 comprising the rod member 35 is shown by arrows 33. The raw material supply unit 4 includes a drive unit 15 for moving the bottom of the raw material supply container 14 in a stepwise manner by actuating the lifting unit 34. For the generation of each new layer, the bottom of the raw material supply container 14 is moved a step upwards such that a volume corresponding to the thickness of a new layer is supplied to the raw material chamber 20 connecting the raw material supply container 14 and the raw material container 5.

The raw material container 5 is also movable in a direction normal to the chamber bottom 36 of the raw material chamber, which is normal to the plane of the raw material surface 7. In particular, a drive unit 18 can be foreseen for allowing the bottom 36 the raw material container 5 to move away from the bottom of the raw material chamber, which is in FIG. 5 shown as a downward movement, which is indicated by arrows 38.

The window element 2 can include a heating surface for heating the raw material surface 7 of the raw material 6 in the raw material container 5 as well as the raw material surface 37 of the raw material in the raw material supply container 14.

The control unit can in particular control the movement of the beam source 53 along a plane parallel to the raw material surface and extending in the x and y directions of an orthogonal three-dimensional coordinate system. Only the movement in y-direction is shown in FIG. 5, the x-direction being normal to the plane of the drawing.

The energy beam 8 travels through the window element 2 and the protection element 70 onto the raw material surface 7 such that a first or preceding solid layer 20 of the solid article 10 is obtained when directing the energy beam 8 onto the raw material surface 7. In at least one subsequent step, a second or subsequent layer of the raw material 6 is supplied from the raw material supply unit and deposited on top of the first layer. This subsequent step can be repeated until the solid article 10 is obtained by adding the solid layers 20 one upon each other. The raw material container 5 or at least the bottom 36 thereof is successively moved downwardly by the drive unit 18. After completion of the last solid layer, the additive manufacturing process of the solid article 10 is completed. The solid article 10 is embedded in the raw material 6. The raw material container 5 can be extracted from the additive manufacturing device 1 or the solid article 10 buried in the raw material 6 can be dug out. The unused raw material is removed therefrom and may be refilled into the raw material supply container 14 for manufacturing another solid article. The solid article 10 is thus separated from the raw material 6, which may be re-used and thus recycled.

The window element 2 and the protection element 70 is movable towards and away from the raw material surface 7. The direction of the movement is indicated by the arrows 39. The window element 2 can comprise also in this embodiment a heating surface, an annular heating surface or a plurality of heating surface segments.

The window element 2 and the protection element 70 have been moved in a rest position to allow the passage of the raw material distribution unit 16 over the raw material surface to distribute a new layer of raw material thereon. After completion of the application of a new layer, the window element 2 and the protection element 70 are lowered, thus the distance between the raw material surface 7 and the protection element 70 is reduced.

The generation unit 3 is turned on, such that the beam can start with the sintering operation to shape a new layer of the solid article 10.

Figure 6A:
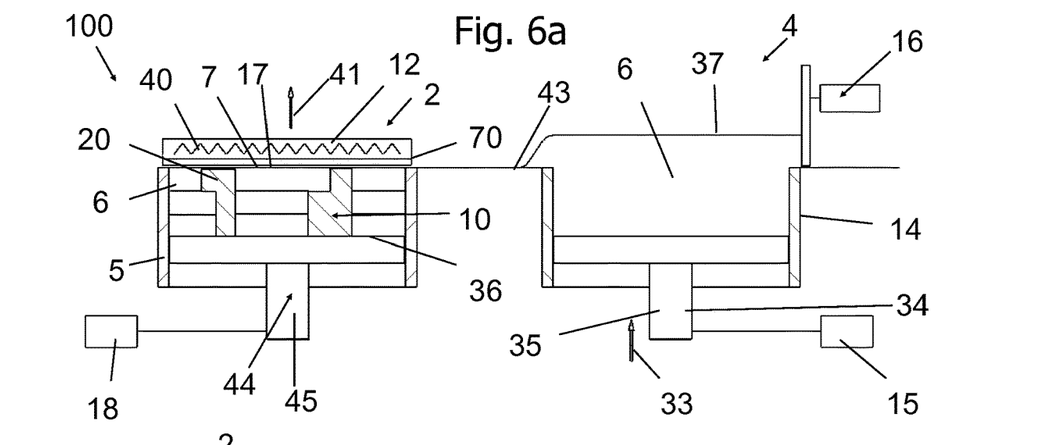

FIG. 6a shows a schematic view of an additive manufacturing device 100 according to a fifth embodiment of the invention. This view represents a first step in the method of manufacture of a solid layer 20 of a solid article 10 by the additive manufacturing device 100. The elements, which have the same function as in any one of the preceding embodiments, carry the same reference numbers. The additive manufacturing device 100 includes a window element 2 for manufacturing a solid article 10 in an additive manufacturing sequence. The additive manufacturing device comprises a beam generation unit 3 (which is omitted in FIG. 6a), in particular laser generation unit, for instance a diode laser generation unit, a raw material supply unit 4 and a raw material container 5 containing a raw material 6. The raw material 6 has a raw material surface 7, which can be exposed to an energy beam to be emitted by the beam generation unit when it is operated.

The window element 2 can include a heating surface to provide thermal energy to the raw material surface 7 to form a pre-heated raw material surface 17 when switched on. The heating surface 12 according to this embodiment is heated by a heating element 40. FIG. 6a shows the moment in time in which a solid layer 20 has just been completed by an operational sequence of the additive manufacturing device. The heating element 40 may be switched off during this moment. According to the current embodiment, the heating element 40 transmits thermal energy to the heating surface 12 when switched on. Thus, the heating surface 12 may be passively heated by the heating element 40.

In a first step the window element 2 and the protection element 70 are moved away from the material surface 7 or the pre-heated raw material surface 17 after completion of the solid layer 20 of the solid article 10 as by arrow 41. The additive manufacturing device 100 is prepared in this stage for the application of a further layer, which is applied onto the raw material containing the solid layer 20.

The protection element 70 has been in contact with the raw material surface 7 during the generation of the solid layer 20. Thereby a heat transfer from the heating surface 12 to the raw material surface 7 is performed predominantly by conduction with almost no convective heat transfer. Thereby the heat loss is minimized and the energy efficiency increased.

For the generation of a subsequent layer, new raw material has to be supplied onto the raw material surface 7. Therefore, a raw material supply unit 4 is provided. The raw material supply unit 4 can include a raw material supply container 14, which is filled with raw material 6. Concurrently to the lifting movement of the window element 2 and the protection element 70, new raw material can be supplied from the raw material supply container 14. The raw material container 14 contains the raw material 6 having a raw material surface 37. The raw material supply container 14 or the raw material 6 stored inside the raw material supply container is movable in a direction normal to the plane containing the layer of raw material for manufacture of the solid article by the additive manufacturing method. In particular, a piston-shaped lifting unit 34 can be provided in the raw material supply container 14, which includes the bottom of the raw material supply container and a rod member 35 attached thereto. The direction of movement of the lifting unit 34 comprising the rod member 35 is shown by arrow 33. The raw material supply unit 4 includes a drive unit 15 for moving the bottom of the raw material supply container 14 in a stepwise manner by actuating the lifting unit 34. For the generation of each new layer, the bottom of the raw material supply container 14 is moved a step upwards such that a volume corresponding to the thickness of a new layer is supplied to the raw material chamber 20 connecting the raw material supply container 14 and the raw material container 5.

The raw material container and the raw material supply container open into a raw material chamber having a bottom surface 43. Once the bottom of the raw material supply container 14 is moved a step upward, the raw material for a second or subsequent layer is provided. According to FIG. 6a, the raw material is spilled onto the bottom surface 43. This raw material is to be distributed on the surface of the first layer or preceding layer for which the additive manufacturing process has already been completed. A raw material distribution unit 16 is provided for distributing the raw material to form a new raw material surface 7. The raw material distribution unit 16 can be configured as a pushing element. However, this graphic representation is by no way limiting the disclosure to pushing elements. A pushing element can be chosen in particular from the group of rollers, doctor blades. Alternatively or in addition thereto, any other suitable device for transferring the raw material onto the top of the pre-heated raw material surface 17 can be provided. The raw material distribution unit 16 can perform a sliding or rolling movement along the bottom surface 43 of the raw material chamber as shown in FIG. 6c.

Figure 6B:
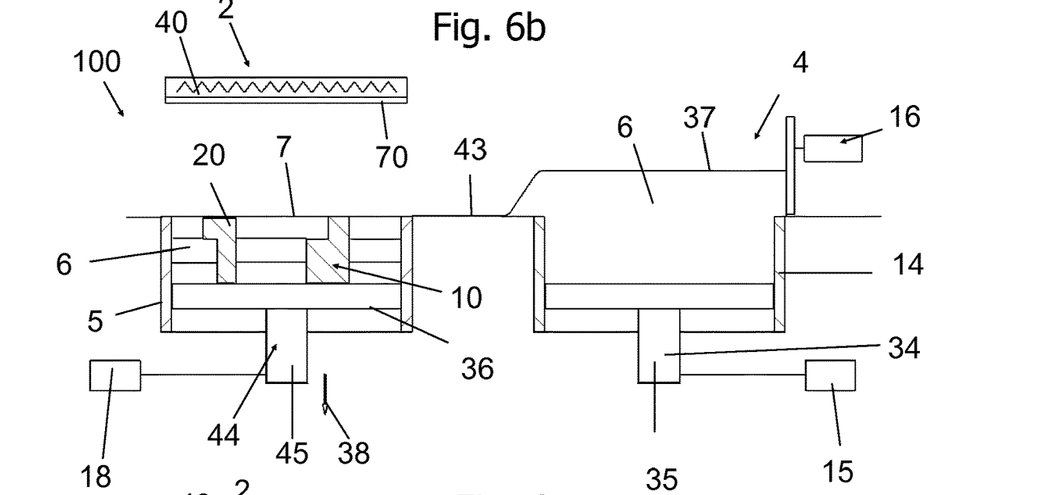

FIG. 6b shows a schematic view of an additive manufacturing device 100 according to the fifth embodiment showing a second step in which the window element 2 and the protection element 70 is removed from the raw material surface 7. A layer of a thickness of less than 1 mm is to be applied on top of the raw material surface 7 by the raw material supply unit 4. According to a preferred embodiment, the thickness or height of the layer is about 100 µm. The result of the movement of the lifting unit 34 is shown in FIG. 6b. A portion of the raw material 6 stored in the raw material supply container 14 has been provided. Before the raw material distribution unit 16 can supply the raw material to the raw material container 5, a volume corresponding to the volume of the new layer has to be provided in the raw material container 5. This volume is provided by lowering the bottom 36 of the raw material container 5, as indicated by arrow 38 by a level adjustment unit 44. According to this configuration a drive unit 18 is provided, which acts on a rod member 45 attached to a piston body forming the bottom 36 of raw material container 5.

Figure 6C:
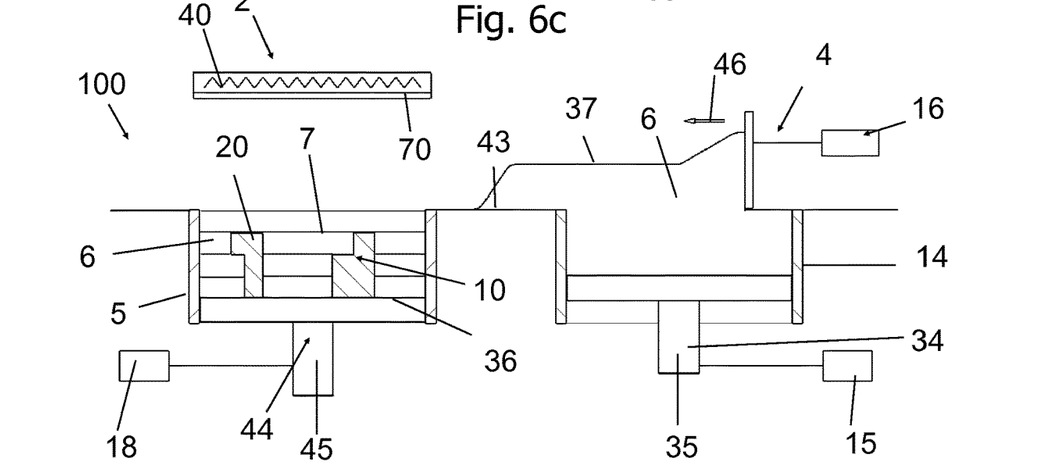

FIG. 6c shows a schematic view of an additive manufacturing device 100 according to the fifth embodiment showing a third step of the method. The raw material distribution unit 16 pushes the volume of raw material supplied for generation of the second or subsequent layer to the raw material container 5. The raw material container 5 or the raw material 6 and the portion of the solid article 10 embedded in the raw material has been moved by the level adjustment unit 44 in a direction normal to the chamber bottom 36 of the raw material chamber, which is normal to the plane of the raw material surface 7. In particular, the drive unit 18 has moved the bottom 36 the raw material container 5 away from the bottom of the raw material chamber, which is in FIG. 6c shown as the result of the downward movement performed during the stage depicted in FIG. 6b. The raw material supplied from the raw material container 14 is moved by the raw material distribution unit 16 in the direction of the raw material container 5. The direction of this movement is indicated by arrow 46.

Figure 6D:
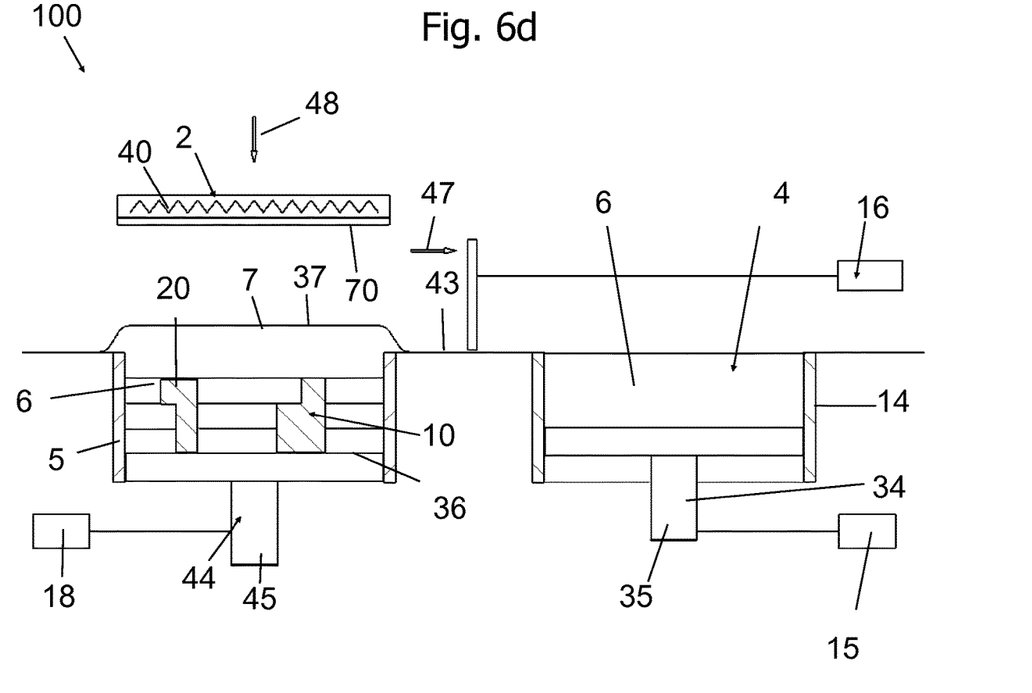

FIG. 6d is a schematic view of an additive manufacturing device 100 according to the fifth embodiment showing a fourth step of the method. During this step, the pushing element is moved away from the raw material container 5 again as indicated by arrow 47. The window element 2 and the protection element 70 are moved towards the raw material surface 7, which now corresponds to the new raw material surface 37 generated by the supply of new raw material from raw material container 14 as described in connection with the previous steps.

Figure 6E:
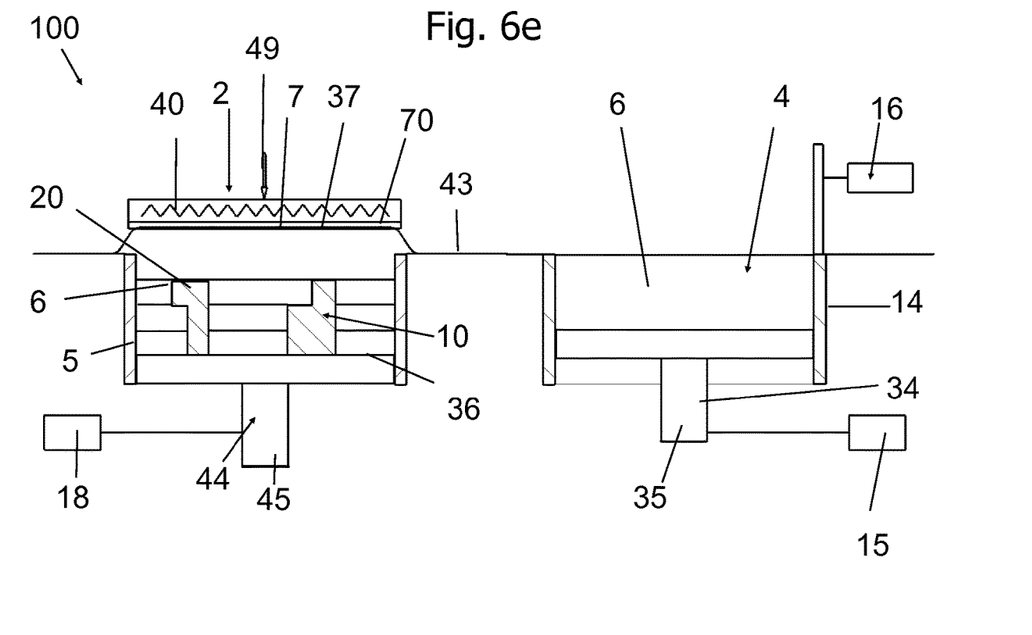

FIG. 6e is a schematic view of an additive manufacturing device 100 according to the fifth embodiment showing a fifth step of the method, in which the pushing element of the raw material distribution unit 16 is moved into the initial position as shown in FIG. 6a or FIG. 6b. Furthermore, it is shown in FIG. 6e that the heating surface 12 of the window element 2 is positioned on top of the raw material surface 7, 37. At this stage, the heating element 40 can already be switched on. In FIG. 6e, it is shown that the thickness of the uppermost raw material layer containing the raw material surface 7, 37 is greater than the thickness of the layers thereunder for which the additive manufacturing method has already been completed.

Prior to a new cycle for generating a further solid layer of the solid article 20, the raw material is compacted. The compaction or compression of the raw material is obtained by moving the window element 2 into the direction of raw material 6 containing the already finished portion of the solid article 10. This movement is shown as a downward movement by arrow 49. By compressing the raw material, the raw material density can be increased. In particular, if the raw material is a powder, the density of the powder is increased as the volume of voids between the particles is reduced. Therefore, the porosity of such a powder is reduced.

Figure 6F:
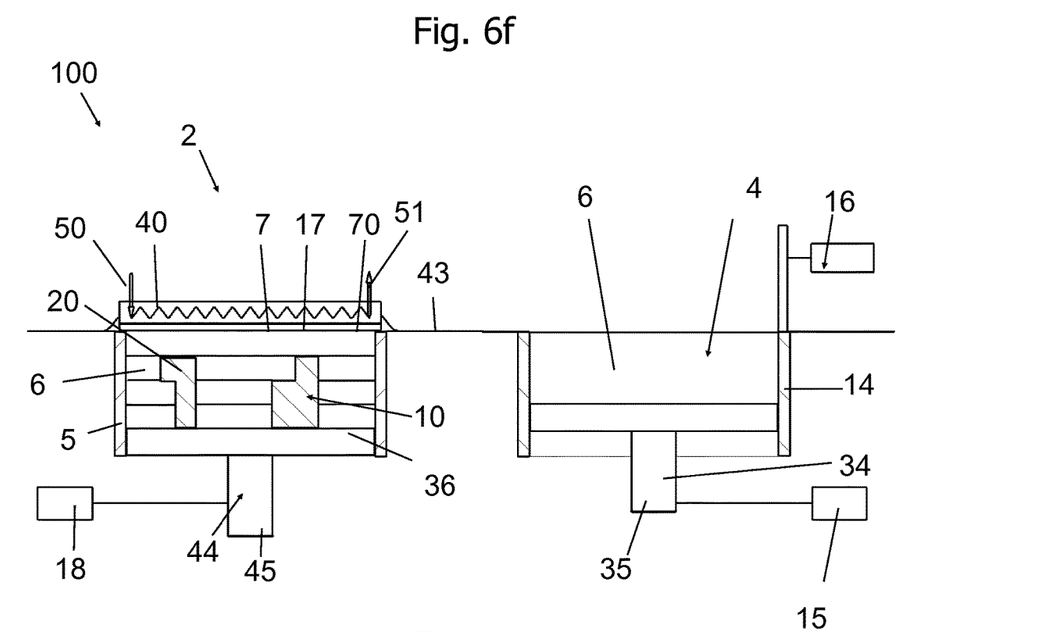

FIG. 6f is a schematic view of an additive manufacturing device 100 according to the fifth embodiment showing a sixth step of the method, in which the compaction or compression of the raw material in the raw material container 6 has been completed. The heating element 40 of the window element 2 can be switched on to generate a pre-heated raw material surface 17. The heating element 40 is fed with thermal energy from a medium, as shown schematically by arrow 50. Arrow 51 schematically shows a discharge of the medium. The medium can include any of a current flow, a flow involving a magnetic or electric field or a fluid flow. The window element 2 includes a heating surface 12 for heating the raw material surface 7 of the raw material 6 in the raw material container 5. The heating surface 12 extends towards the protection element 70 and thus the raw material surface 7 and the raw material surface 37 of the raw material 6. The heating surface 12 can be a portion of the heating element 40 or can be a separate thin-walled element attached to the heating element 40. In particular, the heating surface 12 may receive thermal energy from the heating element 40, such that the heating surface is passively heated. The raw material surface 7, 37 is pre-heated by the thermal energy generated by the heating surface 12 to from a pre-heated raw material surface 17. The window element 2 according to this embodiment can be of a rectangular or circular cross-section corresponding to the cross-section of the raw material container 5 and the raw material supply container 14. The window element 2 or the protection element 70 can comprise also in this embodiment an annular heating surface or a plurality of heating surface segments.

Figure 6G:
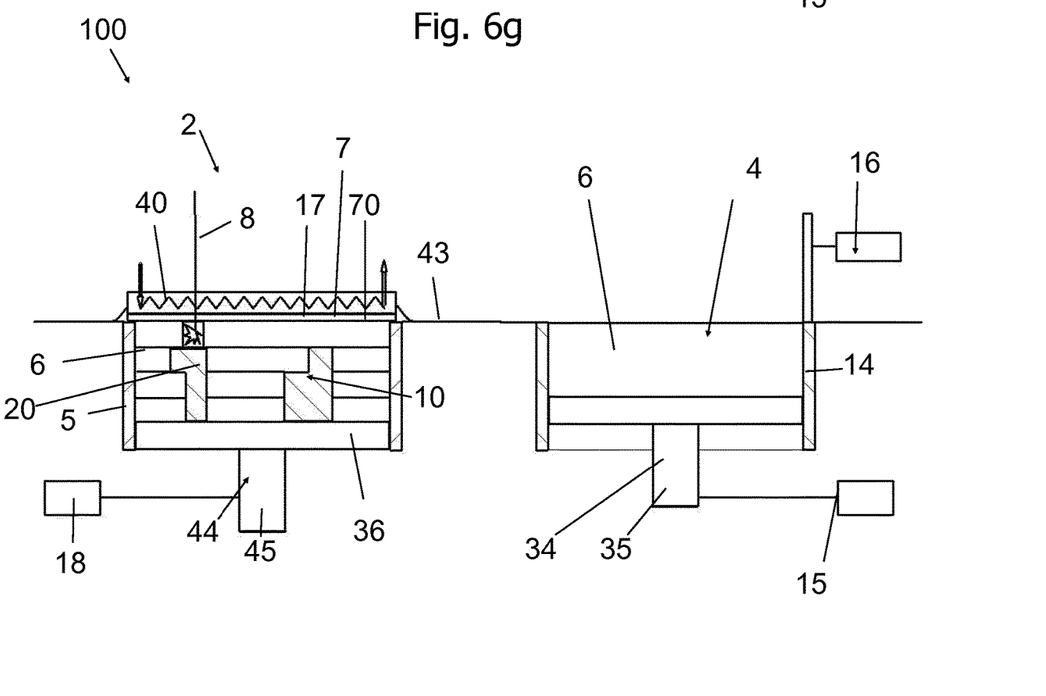

FIG. 6g is a schematic view of an additive manufacturing device 100 according to the fifth embodiment showing a seventh step of the method in which the generation a new solid layer 20 of the solid article is performed. An energy beam 8 is directed through the window element 2 and the protection element 70 onto the pre-heated raw material surface. The pre-heated raw material surface 17 thereby comprises advantageously a pre-heating of the entire layer of raw material. By pre-heating the raw material surface, the thermal stress introduced by the energy supplied by the energy beam 8 is reduced, thereby warping effects can be reduced if not entirely avoided.

According to an embodiment, the heating surface 12 and the heating element 40 are transparent to the energy beam, such that the energy beam passes through the heating surface 12 and the heating element 40. The heating surface or each of the heating surface segments can be heated by a heating element from the group of a radiation heater, an induction heater or a resistance heater. According to an embodiment, the heating element can be arranged outside of the travel path of the beam. The heating surface 12 is heated by the heating element. According to this embodiment, a transparency of the heating element for the beam is not required. The heating surface 12 or the heating element 40 can be also included in the protection element.

The energy beam 8 generated and emitted by the beam generation unit 3 is directed by a directing unit 13 (see FIG. 1, 5) onto the pre-heated raw material surface. The beam can proceed at a speed of at least 50 mm/s. That means, the beam travels at a speed of at least 50 mm/s over the preheated raw material surface and sinters the pre-heated raw material surface 17 at the spots of contact. The energy beam 8 generated by the beam generation unit 3 travels through the window element 4, the protection element 70 and the optional heating surface 12 and optionally through the heating element 40.

The energy beam 8 is directed over the pre-heated raw material surface 17 according to a computer-generated model of the solid article 10 stored in a storage unit 11 associated with the control unit 9. The energy beam 8 travels through the heating surface 12 onto the pre-heated raw material surface 17 such that a first or preceding solid layer 20 of the solid article 10 is obtained when directing the beam 8 onto the pre-heated raw material surface 17. In at least one subsequent step, a second or subsequent layer of the raw material 6 is supplied from the raw material supply unit and deposited on top of the first layer. This subsequent step can be repeated until the solid article 10 is obtained by adding the solid layers 20 one upon each other. The raw material container 5 or at least the bottom 36 thereof is successively moved downwardly by the drive unit 18. After completion of the last solid layer, the additive manufacturing process of the solid article 10 is completed. The solid article 10 is embedded in the raw material 6. The raw material container 5 can be extracted from the additive manufacturing device 1 or the solid article 10 buried in the raw material 6 can be dug out. The unused raw material is removed therefrom and may be refilled into the raw material supply container 14 for manufacturing another solid article. The solid article 10 is thus separated from the raw material 6, which may be re-used and thus recycled.

Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of an element or compound selected from the group consisting of A, B, C . . . and N, the text should be interpreted as requiring only one element from the group, not A plus N, or B plus N, etc.

The invention claimed is:

1. An additive manufacturing device configured as a selective sintering device, comprising a beam generation unit, a raw material container, a raw material supply unit and a window element for transmission of an energy beam emittable by the beam generation unit to the raw material container, wherein the raw material container contains a raw material comprising a powder, wherein the raw material is arranged in a plurality of raw material layers arranged upon each other for manufacturing a solid article from the plurality of raw material layers, such that an uppermost raw material layer including a raw material surface is exposed to the energy beam emitted by the beam generation unit when the beam generation unit is operated, wherein the window element is fixedly placed in a horizontal plane direction in between the beam generation unit and the raw material container, wherein the window element comprises a first surface and a second surface, wherein the first surface faces the beam generation unit and the second surface faces the raw material surface, wherein the second surface is covered by a protection element, wherein the protection element is transparent for the energy beam such that in operation, the energy beam passes through the protection element, wherein the protection element is configured to perform a sliding movement such that the protection element is movable relative to the window element, such that the protection element can be removed or exchanged, wherein the protection element comprises a sheet element which can be removably attached to the window element, wherein the protection element comprises at least one of PTFE or ETFE.

2. The additive manufacturing device according to claim 1, wherein the protection element comprises a transparent foil.

3. The additive manufacturing device according to claim 1, wherein the protection element is temperature resistant to least 100 degrees Celsius.

4. The additive manufacturing device according to claim 1, whereby at least one of the window element or the protection element includes a heating surface for heating the raw material surface to form a pre-heated raw material surface.

5. The additive manufacturing device according to claim 4, whereby the beam generation unit comprises a directing unit to direct the energy beam onto the pre-heated raw material surface according to a computer-generated model of the solid article stored in a storage unit associated with a control unit, whereby the energy beam generated by the beam generation unit passes through the heating surface onto the pre-heated raw material surface.

6. The additive manufacturing device according to claim 1, wherein the beam generation unit is movable relative to the raw material surface, such that the angle of the energy beam relative to the raw material surface substantially remains constant.

7. The additive manufacturing device according to claim 1, wherein the protection element is in contact with the raw material surface at least during the period of operation of the energy beam for creation of the solid article.

8. The additive manufacturing device according to claim 1, whereby the protection element is arranged at a first distance to the raw material surface during operation of the energy beam and the protection element is arranged at a second distance to the raw material surface after the raw material surface has been exposed to the energy beam or before the raw material surface has been exposed to the energy beam, whereby the first distance can be smaller than the second distance.

9. A method for operating an additive manufacturing device, configured as a selective sintering device, for manufacturing a solid article by an additive manufacturing method, comprising a beam generation unit, a raw material supply unit, a raw material container for manufacturing a solid article from a plurality of raw material layers, whereby the raw material comprises a powder, whereby an energy beam is emitted by the energy beam generation unit and is transmitted through a window element fixedly arranged in a path in a horizontal plane direction in between the beam generation unit and the raw material container, whereby the raw material container contains a raw material arranged in a plurality of raw material layers arranged upon each other, such that an uppermost raw material layer including a raw material surface is exposed to the energy beam, whereby the window element comprises a first surface and a second surface, whereby the first surface faces the beam generation unit and the second surface faces the raw material container, wherein the second surface is covered by a protection element such that when in a first step the energy beam hits the raw material surface, any by-product deposits on the protection element, whereby the protection element is transparent for the energy beam such that the energy beam passes through the protection element, wherein the protection element is configured to perform a sliding movement such that the protection element is movable relative to the window element, such that the protection element can be removed or exchanged, wherein the protection element comprises a sheet element which can be removably attached to the window element, wherein the protection element comprises at least one of PTFE or ETFE.

10. The method according to claim 9, whereby the protection element, which is contaminated by the by-product, is removed in a second step and can be replaced by a new protection element.

11. The method according to claim 9, whereby the window element comprises a heating surface for heating the raw material surface in the raw material container, whereby in a third step, the raw material is pre-heated by the thermal energy generated by the heating surface to from a pre-heated raw material surface, whereby the energy beam is generated by the beam generation unit, whereby a directing unit directs the energy beam emitted by the beam generation unit onto the pre-heated raw material surface, such that the energy beam is directed over the pre-heated raw material surface according to a computer generated model of the solid article stored in a storage unit associated with the control unit, whereby the energy beam is directed through the heating surface and the protection element onto the pre-heated raw material surface such that a first solid layer portion of the solid article is obtained when directing the energy beam onto the pre-heated raw material surface, and in at least one subsequent step a second layer of the raw material is supplied from the raw material supply unit and deposited on top of the first layer, wherein, in at least one optional further subsequent step, the operations performed in the previous steps are repeated until the solid article is obtained.

12. The additive manufacturing device according to claim 1, wherein the raw material supply unit includes a raw material supply container which is filled with a raw material, wherein the raw material supply container is movable in a direction perpendicular to a plane containing the uppermost layer of raw material for manufacture of the solid article.

13. The additive manufacturing device according to claim 1, wherein a raw material distribution unit is provided for distributing the raw material to the raw material supply container.

* * * * *